Patented May 1, 1951

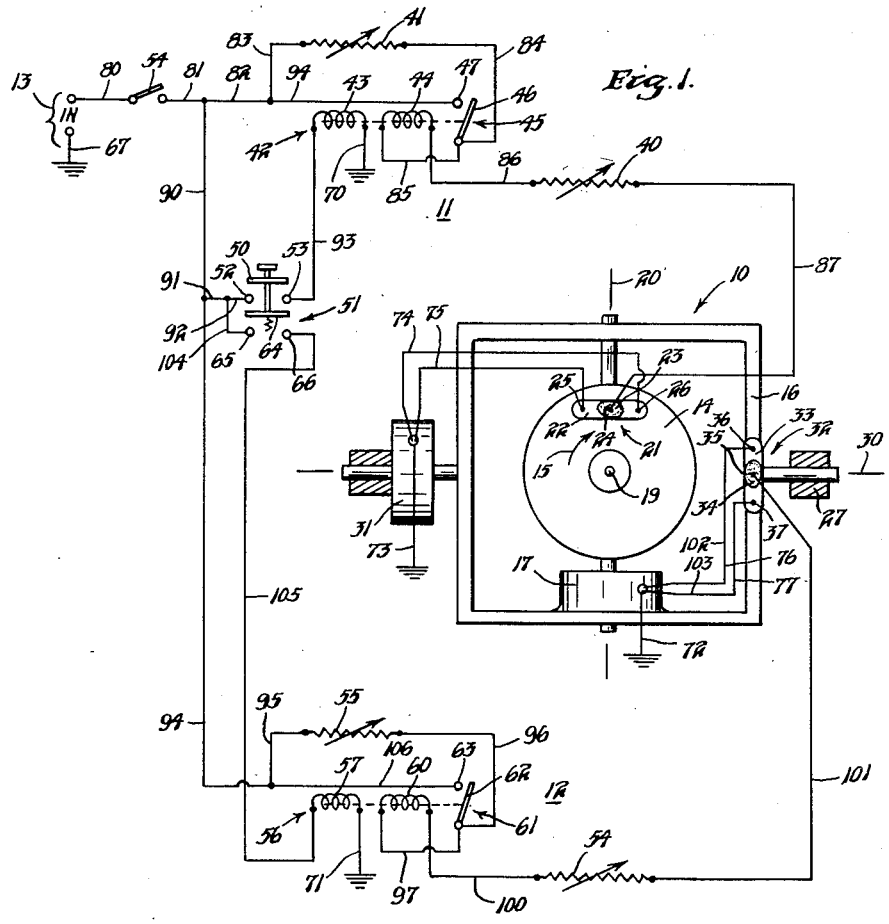

2,551,069

UNITED STATES PATENT OFFICE 2,551,069

SPIN AXIS CONTROL MEANS FOR GYROSCOPIC INSTRUMENTS

Fred P. Strother, Riverside, Conn., assignor to Minneapolis-Honeywell Regulator Company, Minneapolis, Minn., a corporation of Delaware Application December 7, 1946, Serial No. 714,889

10 Claims. (Cl. 74—5.47)

This invention relates to the field of gyroscopic instruments, and more particularly to control systems for maintaining the spin axes of the gyroscopes of such instruments in a predetermined relation to the surface of the earth. The spin axis of a vertical gyroscope or gyroscopic horizon, for example, must be maintained rigorously vertical, while if the spin axis of a directional gyrocope is not maintained horizontal its turning moment is reduced. Such systems for controlling the direction of the spin axis of a gyroscope are referred to in this specification and in the art as erection systems.

Erection systems for gyroscopic instruments are not broadly new, and it is also known to provide means for adjusting the rate at which such erection systems operate. This adjustability is desirable because an instrument with a rapid erection rate is less sensitive and more prone to hunting than an instrument with a slower erection rate: on the other hand instruments with slow erection rates take a long time to assume the desired attitude, or to return to it if displaced.

The usual practice is for the operator of the instrument in question—say, for example, an aircraft pilot—to energize his gyroscopic instruments some time before he plans to rely on them, so their erection systems will have a sufficiently long interval in which to perform their functions. This is, of course, unproductive use of the instruments, and of the operator's time. Alternatively, the instruments may be energized only a relatively short time before their use is contemplated, at a high erection rate, the operator switching to a low erection rate after the desired attitude of the gyroscope has been obtained. This system has the advantage of reducing the number of unproductive instrument and operator hours, and also makes it possible to erect the instruments at a fairly rapid rate during flight, if they should happen to become widely displaced. The system has the disadvantage, however, that the operator must remember to reduce the erection rate before relying on the indications of the instrument, since erratic operation frequently takes place in gyroscopic instruments having high erection rates.

The present invention relates to means for providing adjustable erection rates for gyroscopic instruments without burdening the operator with the necessity of remembering when the high erection rate is prevailing and reducing it before relying on the instruments. It is accordingly an object of this invention to provide an improved variable erection rate system for gyroscopic instruments.

An object of the invention is to provide means for causing movement of a body to a desired position at a first rate, and means for automatically altering the rate of movement of the body when the desired position prevails.

Another object of the invention is to provide a gyroscope, having an erection system capable of operating at more than one rate, with means for selecting a first rate of erection, and means automatically bringing about a second rate of erection when the gyroscope attains an erect attitude.

A further object of the invention is to provide a gyroscope, having a mercury switch and torque motor type of erection system, with means for normally maintaining the torque of the motor, at a certain reduced magnitude, and with means, including a relay, a holding circuit, and a momentary contact circuit, for cooperating with the mercury switch means to disable the torque reducing means until the erect attitude of the gyroscope is attained.

A more specific object of the invention is to provide a switching system in which momentary actuation of a first switch member initiates a first circuit condition and maintains this condition until a second switch member moves out of a first position, later return of the second switch member to its first position being ineffective to reestablish the first circuit condition.

Various other objects, advantages and features of novelty which characterize my invention are pointed out with particularity in the claims annexed hereto and forming a part herewith. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

In the drawing:

Figure 1 is a schematic showing of an erection system for gyroscopic instruments according to my invention, the gyroscopic instrument being shown in plan; and Figure 2 is a fragmentary view of a modification of the system of Figure 1.

Referring now to Figure 1, there is shown a gyroscopic instrument 10 having having a spin axis 19 perpendicular to the plane of the paper. The gyroscope is mounted for rotation about a pair of mutually perpendicular precession axes 20 and 30. Erection systems 11 and 12 are provided for controlling the position of the gyroscope about its precession axes, and are energized from a suitable source 13 of electrical energy.

Gyroscopic instrument 10 is shown to comprise a rotor housing 14 within which a rotor, not shown, is caused to rotate at a high speed, in the direction indicated by arrow 15, about axis 19 perpendicular to the plane of the paper. Housing 14 is pivotally mounted within a Cardan ring 16 for rotation about precession axis 20 and a torque motor 17 is provided to apply torque, about axis 20, between the housing 14 and Cardan ring 16. Torque motor 17 may be in the form of a dynamo-electric machine, a reversibly energizable solenoid, a weight displacing device, or any other electrically operated torque-applying means capable of applying increasing torque when increasingly energized, and since the details of its structure comprise no part of the present invention, they are not shown in the drawing.

A mercury switch 21, functioning as a single pole double throw switch, is also carried on housing 14. Switch 21 comprises an envelope 22 enclosing a globule of mercury 23, and a central electrode 24 and two end electrodes 25 and 26 spaced oppositely therefrom are located in the envelope in such a fashion that the globule can complete either a circuit between electrodes 24 and 25 or one between electrodes 24 and 26, depending upon the direction of deviation of housing 14 from a level attitude about axis 20. The envelope is preferably mounted on housing 14 in such a position that when the spin axis of the gyroscope is vertical, the globule does not complete an electric circuit between either of the pairs of contacts, while tilting of the housing in either direction brings about completion of one or the other of the electric circuits under the control of the mercury switch. This, however, is a matter of choice, as it is known in the art to use equivalent switching structures, for example a switch in which the mercury globule in its central position completes both of the circuits, and tilting of the switch interrupts one or the other.

Cardan ring 16 is mounted, for pivotal movement about precession axis 30, in any suitable support 27 which is fixed to the body whose position in space is to be indicated by the gyroscopic instrument: an aircraft for example. A second torque motor 31, which may be similar in construction to torque motor 17, is provided to apply torque between ring 16 and mounting 27. A second mercury switch 32 is shown, which is like switch 21 and comprises an envelope 33, a mercury globule 34, a central electrode 35, and oppositely spaced end electrodes 36, 37. Switch 32 is mounted on Cardan ring 16 so that the position of the mercury globule is affected by rotation of ring 16 about axis 30. I prefer that switch 32 be so mounted that when the spin axis of the gyroscope is vertical the globule does not complete either electric circuit, while if the instrument deviates about axis 30 globule 34 can complete either a circuit between electrodes 35 and 36 or one between electrodes 35 and 37.

Mercury switch 21 and torque motor 31 comprise portions of the first erection system 11, which is effective about precession axis 20 of the gyroscope. This system also includes a pair of variable resistors 40 and 41 and a relay 42, having first and second windings 43 and 44 and a switching member 45 including a blade 46 and a fixed contact 47. In the normal operation of relay 42 neither winding 44 nor winding 43 alone is capable of drawing blade 46 into engagement with fixed contact 47, but the simultaneous energization of both windings provides sufficient force to operate blade 46. Erection system 11 also includes one blade 50 of a push button or momentary contact switch 51 having a second blade 64 and fixed contacts 52, 53, 65 and 66. Operation of switch 51 is effective to cause blade 50 to complete a circuit between fixed contacts 52 and 53: when manual actuation of switch 51 is discontinued the circuit between contacts 52 and 53 is broken.

Torque motor 17 and mercury switch 32 comprise portions of the second erection system 12 which is effective around precession axis 30. This system includes a pair of variable resistors 54 and 55, and a relay 56 similar to relay 42, having first and second windings 57 and 60 and a switching member 61 including a blade 62 and a fixed contact 63. Erection system 12 also includes the second blade 64 of switch 51, which is effective upon manual actuation of the switch to close a circuit between fixed contacts 65 and 66.

Electrical energy for the erection systems described above is derived from source 13 through a main switch 54.

*Operation*

The erection system is shown in Figure 1 in its deenergized condition, but with the gyroscope erect about both axes. The gyroscope is preferably mounted in the aircraft with one of the axes 20 and 30 parallel to the longitudinal axis of the craft. The system is energized by closing switch 54, but no current flows in the system because momentary switch 51 and mercury switches 21 and 32 are all in their open position.

Suppose now that rotor housing 14 deviates about axis 20 from the condition in which its spin axis is vertical, so that mercury globule 23 completes the connection between central electrode 24 and end electrode 25. An electrical circuit may now be traced from source 13 through conductor 80, switch 54, conductors 81, 82 and 83, variable resistor 41, conductors 84 and 85, winding 44 of relay 42, conductor 86, variable resistor 40, conductor 87, central electrode 24, mercury globule 23, and electrode 25, conductor 75, torque motor 31, ground connection 73, ground connection 67, and back to the source. The degree of energization of torque motor 31 depends upon the resistances of resistors 40 and 41, whose values are set as will presently be described: in any case, the current flowing in this circuit through winding 44 is not sufficient to draw blade 46 into engagement with fixed contact 47. The energization of motor 31 applying torque about the axis 30 of the gyroscope is effective according to the ordinary laws of precession in gyroscopes to return housing 14 to its normal condition, and when this takes place mercury globule 23 interrupts the circuit and torque motor 31 is deenergized.

If housing 14 deviates so that mercury globule 23 completes the connection between central electrode 24 and end electrode 26, an electrical circuit may be traced from source 13 through conductor 80, switch 54, conductors 81, 82 and 83, variable resistor 41, conductors 84 and 85, winding 44 of relay 42, conductor 86, variable resistor 40, conductor 87, central electrode 24, mercury globule 23, and electrode 26, conductor 74, torque motor 31, ground connection 73, ground connection 67, and back to the source. Energization of torque motor 31 through this circuit brings about application of torque opposite to that previously described, which results in opposite erection of gyro housing 14 so that it again assumes its normal condition; mercury globule 23 interrupts the circuit between electrodes 24 and 26 and torque motor 31 is deenergized.

If Cardan ring 16 deviates about axis 30 from the condition in which the spin axis of the gyroscope is vertical, so that mercury globule 34 completes the connection between central electrode 35 and end electrode 36, an electrical circuit may be traced from source 13 through conductor 80, switch 54, conductors 81, 90, 94 and 95, variable resistor 55, conductors 96 and 97, winding 60 of relay 56, conductor 100, variable resistor 54, conductor 101, central electrode 35, mercury globule 34, and electrode 36, conductor 102, torque motor 17, ground connections 72, ground connection 67, and back to the source. The amount of current flowing in this circuit is determined by the settings of resistors 55 and 54, but in any case is not sufficient to draw blade 62 into engagement with fixed contact 63. The energization of torque motor 17 is effective to return Cardan ring 16 to its normal position, in which the connection between central electrode 35 and end electrode 36 is broken by mercury globule 34, and torque motor 17 is deenergized.

If Cardan ring 16 deviates so that mercury globule 34 completes the connection between central electrode 35 and end electrode 37, an electrical circuit may be traced from source 13 through conductor 80, switch 54, conductors 81, 90, 94 and 95, variable resistor 55, conductors 96 and 97, winding 60 of relay 56, conductor 100, variable resistor 54, conductor 101, central electrode 35, mercury globule 34, electrode 37, conductor 103, torque motor 17, ground connection 72, ground connection 67, and back to the source. By this circuit torque motor 17 is energized to apply torque in the opposite direction to that formerly described, returning Cardan ring 16 to its normal position where mercury globule 34 interrupts the circuit between central electrode 35 and end electrode 37, and torque motor 17 is deenergized.

If the gyroscope deviates from its normal position about both axis 20 and axis 30 at the same time, torque motors 17 and 31 are both energized, and operate simultaneously to return the gyro to its normal attitude about both its axes.

The action described so far is the normal operation of the erecting means. The switch 51 is employed to secure a more rapid rate of erection. When switch 54 is closed, manual operation of switch 51 is effective to complete the following pair of further circuits. The first circuit may be traced from source 13 through conductor 80, switch 54, conductors 81, 90, 91 and 92, fixed contact 52, blade 50 and fixed contact 53 of switch 51, conductor 93, winding 43 of relay 42, ground connection 70, ground connection 67, and back to the source. The second circuit may be traced from source 13 through conductor 80, switch 54, conductors 81, 90, 91 and 104, fixed contact 65, blade 64, and fixed contact 66 of switch 51, conductor 105, winding 57 of relay 56, ground connection 71, ground connection 67, and back to the source. It will thus be evident that manual closing of switch 51 energizes winding 43 of relay 42 and winding 57 of relay 56. However, as long as the gyroscope is in its normal erect condition actuation of switch 51 is without effect, since energization of either of these coils by itself is not sufficient to actuate its contact arm.

If gyro housing has deviated from its normal condition so that torque motor 31 is being energized through mercury switch 21 and conductor 87, and if then manual switch 51 is actuated, both winding 43 and winding 44 of relay 42 are energized at the same time. This causes movement of blade 46 of relay 42 into engagement with fixed contact 47, as previously pointed out. This movement of blade 46 short circuits variable resistor 41 through a circuit including conductor 94, fixed contact 47, blade 46, thus reducing the resistance in series with torque motor 31. The torque motor receives greater energization and therefore exerts greater force, causing erection of the gyroscope at a higher rate. If switch 51 is released while erection of the gyroscope is taking place, energization of winding 43 is interrupted, but the increased flow of current in winding 44 due to the short circuiting of resistor 41 is sufficient to maintain the relay in its operated condition. Energization of torque motor 31 at the increased rate continues until the circuit is interrupted by mercury switch 21. When mercury switch 21 opens the circuit, the flow of current in winding 44 ceases, blade 46 falls away from fixed contact 47, removing the short circuit from variable resistor 41. Subsequent closure of the circuit by mercury switch 21 establishes the original series circuit including variable resistor 41, and is ineffective to operate relay 42.

The same circuit conditions prevail as regards relay 56. If momentary contact switch 51 is operated when torque motor 17 is being energized through mercury switch 32, windings 57 and 60 of relay 56 are simultaneously energized. This causes movement of blade 62 into engagement with fixed contact 63, short circuiting variable resistor 55 through a circuit including conductor 106, fixed contact 63, blade 62. Energization of torque motor 17 at an increased rate, causing more rapid erection of the gyroscope about the axis 30, accordingly takes place, and the increased current in winding 60 due to the short circuiting of variable resistor 55 is sufficient to maintain the relay in its closed position when the momentary actuation of switch 51 is discontinued. When the Cardan ring resumes its normal attitude about the axis 30, the circuit is interrupted by mercury switch 32, relay 56 is restored to its normal condition with variable resistor 55 in series with winding 60, and subsequent completion of the circuit by mercury switch 32 is again ineffective to operate relay 56.

In first setting up the system, the gyroscope is operated at its higher erection rates by the manipulation of switch 51, and the erection rates are set, by adjustment of variable resistors 40 and 54, to have the desired values about the two axes. When this has been accomplished, the relays 42 and 56 are allowed to return to their normal conditions as the gyroscope reaches its normal attitude, and thereafter the low rates of its erection about the two axes are set at the desired values by adjustment of resistors 41 and 55.

It should be pointed out that actuation of momentary contact switch 51 is effective to cause simultaneous short circuiting of resistor 41 in erection system 11 and resistor 55 in erection system 12. This does not mean that the erection of the gyroscope about the two axes must take place at the same rate, or be interrupted at the same time. The geometry of the gyroscope may require different rates of operation from the respective erection systems. While both erection systems are thrown into their high rates of operation by operation of momentary contact switch 51, the high rates of erection are separately adjustable by variable resistors 40 and 54, and mercury switches 21 and 32 respond separately to the change in the attitude of the gyroscope about the separate axes, so that the lower rate of erection may be restored in each system independent of the other, as soon as the desired attitude about the axis in question has been achieved.

Figure 2

The embodiment of the invention shown in Figure 1 requires that if the higher erection rate is to be applied to either torque motor it must be applied to both torque motors at once, since only one manual operating means is provided for the two electrical circuit controlling means comprised in switch 51. In Figure 2, a modification of the invention is shown in which the two rate changing switches are mechanically as well as electrically separate, so that the electrical circuit for system 11 may be completed from fixed contact 52 through blade 50 to fixed contact 53 by operation of a first manual means 51a, while the circuit for system 12 may be independently completed from fixed contact 65 to blade 64 to fixed contact 66 by operation of a second, independent manual means 51b. In all other respects the circuit used with the switch in Figure 2 is identical with Figure 1.

Conclusion

From the foregoing it will be apparent that I have invented means for erecting a gyroscope to a desired attitude at a given rate, combined with means for initiating erection of the gyroscope at a faster rate, and for maintaining this faster rate of erection of the gyroscope until a desired attitude has been reached, when the lower rate of erection is automatically restored and maintained regardless of subsequent deviation of the instrument from its desired attitude. The restoring means associated with the two precession axes are independent, and the initial rate changing means may be either independent or interrelated as desired.

Numerous objects and advantages of my invention have been set forth in the foregoing description, together with details of the structure and function of the invention, and many novel features thereof are pointed out in the appended claims. The disclosure however is illustrative only, and I may make changes in detail, especially in matters of shape, size and arrangement of parts, within the principle of the invention, to the full extent indicated by the broad general meaning of the term in which the appended claims are expressed.

I claim as my invention:

1. In a device of the class described, in combination: a gyroscope having a normal attitude about an axis; motor means for applying torque to said gyroscope to adjust the attitude thereof about said axis at a selected rate; means for controlling the operation of said first named means so as to maintain said gyroscope in said normal attitude; means changing the rate at which said first named means adjusts the attitude of said gyroscope; and further means, including a momentarily actuable device effective upon said last named means upon actuation of said device to initiate said changed rate of action of said first named means, said further means including means to maintain the changed erection rate independently of said actuable device only until said gyroscope attains said normal attitude.

2. In a device of the class described, in combination: a gyroscope having a normally level attitude about an axis; reversible motor means for adjusting the attitude of said gyroscope about said axis; a source of electrical energy for said motor means; a reversibly operable mercury switch movable with said gyroscope about said axis for reversibly energizing said motor means on departure of said gyroscope from said level attitude; circuit means, including first and second variable impedance means, connecting said source, said switch and said motor means so that the magnitude of the energization of said motor means is determined by the adjustments of said impedance means, and further means including a momentarily actuable switch and additional means cooperating with said mercury switch to short circuit one of said impedance means, said additional means thereafter serving to maintain said short circuit until said gyroscope attains said level attitude.

3. In a device of the class described, in combination: an electrical device to be energized; first switch means, having inoperative and operative positions, for controlling energization of said device; circuit means, including an impedance member, adapted for connecting with a source, said first switch means and said device; means for short circuiting said member; and further means, including a momentarily actuated second switch means cooperating with said first switch means in the operative position thereof to initiate operation of said short circuiting means on momentary actuation of said second switch means, said further means including means coacting with said first switch means to maintain operation of said short circuiting means until said first switch means is actuated to the inoperative position thereof.

4. In the device of the class described, in combination: a relay having a plurality of windings and a switching member movable from a normal inoperative position to an operative position; a first electrical circuit including an impedance member, one of said relay windings, a switch having operative and inoperative positions, and an electrical device to be energized, said device being adapted to be energized from a source through said member and said winding when said switch is in said operative position; means connecting said switching member across said impedance member so as to short circuit said impedance member when said switching member is in its operative position, the normal current in said circuit when said switch is in its operative position being insufficient to actuate said switching member from its inoperative position to its operative position; a second electrical circuit including a momentarily actuable switch, a second of said relay windings, said second winding being adapted to be energized on momentary actuation of said last named switch to assist said energized first winding, so as to cause said switching member to move into its operative position and short circuit said impedance member, the resulting increased current in said first winding being sufficient to maintain said switching member in said operative position when said momentary actuation of said last named switch is discontinued; movement of said first named switch into an inoperative position interrupting the flow of current in said first circuit and releasing said switching member for movement into its inoperative position.

5. In a device of the class described, in combination: a gyroscope having a precession axis; means, responsive to departure of said gryoscope from a predetermined attitude about said axis, for applying precessing torque at a normal rate to return said gyroscope to said predetermined attitude; means for changing the rate of action of said responsive means; a manually momentarily actuable device; and further means, including said momentarily actuable device and said gyroscope departure responsive means, effective upon said last named means upon momentary actuation of said device during departure from said predetermined attitude to initiate said changed rate of action of said first named means said further means including means to maintain the same effective thereafter independently of said actuable device only until said gyroscope attains said predetermined attitude.

6. In a device of the class described, in combination: a gyroscope having a pair of precession axes; means, responsive to departure of said gyroscope from a predetermined attitude about each said axis, electric motor means controlled by said responsive means for acting at a normal rate to return said gyroscope to said attitude with respect to each said axis; means for changing the rate of action of each said motor means; a momentarily actuable device; and further means, including said momentarily actuable device, effective upon said last named means upon actuation of said device to initiate said changed rates of action of said first named means said further means including holding means operable after such initiation to maintain the changed rate effective independently of said actuable device and means controlled by said responsive means for rendering said holding means ineffective upon said gyroscope attaining said predetermined attitude.

7. In a device of the class described, in combination: a gyroscope having a horizontal precession axis; means responsive to departure of said gyroscope from a desired attitude about said axis; electrically energized torque applying means controlled by said responsive means, for acting at a normal rate to return said gyroscope to said level attitude; means for changing the rate of action of said torque applying means; and further means, including a momentarily actuable device, effective upon said last named means upon actuation of said device to initiate said changed rate of action of said first named means said further means including means to maintain the changed erection rate independent of the actuable device and means effective upon removal of said departure to render said maintaining means inoperable.

8. In a device of the class described, in combination: a gyroscope having a precession axis and a second axis; means for sensing a change in position of said gyroscope about said precession axis; motor means for applying a torque about said second axis; a first circuit control means controlled by said sensing means for applying less than full energization to said torque means through a circuit including a further means; a momentarily actuable second circuit controlling device; additional means operated concomitantly by said sensing means and actuable device for applying full energization to said torque means, said additional means due to full energization being applied thereto thereafter maintaining said additional means in operated position independently of said momentarily actuable device.

9. In combination, means operably responsive to a predetermined condition; means for changing said condition; means including said condition-responsive means for controlling said condition-changing means and effective to cause operation of said condition-changing means at a predetermined rate whenever said condition changes from a desired value to cause said condition-changing means to restore said condition to said desired value; a selectively momentarily operable manual means; additional means positioned by joint operation of said operably responsive means and said manual means for altering the rate of operation of said condition-changing means; holding means controlled by said operably responsive means for maintaining said additional means as positioned while said selective manual means returns to inoperable position, whereby said holding means is rendered ineffective upon said predetermined condition being attained.

10. In a device of the class described, in combination: a member having an axis; means responsive to departure of said member from a predetermined attitude about said axis; motor means controlled by said responsive means for acting at a normal rate to return said member to said predetermined attitude; additional means for changing the rate of action of said motor means; a manually momentarily actuable device; and further means, effective upon said additional means, to initiate said changed rate of action of said motor means in a joint operation with said manually actuable device and to maintain thereafter said changed rate independent of said manually actuable device only until said member attains said predetermined attitude.

FRED P. STROTHER.

REFERENCES CITED

The following references are of record in the file of this patent:

UNITED STATES PATENTS

| Number | Name | Date |
|---|---|---|
| 662,480 | Whittingham | Nov. 27, 1900 |
| 1,556,620 | Lindquist et al. | Oct. 13, 1925 |
| 2,140,191 | Schuchardt et al. | Dec. 13, 1938 |
| 2,270,876 | Esval et al. | Jan. 27, 1942 |
| 2,417,573 | Strother | Mar. 18, 1947 |
| 2,441,307 | Alkan | May 11, 1948 |

FOREIGN PATENTS

| Number | Country | Date |
|---|---|---|
| 597,282 | Great Britain | Jan. 22, 1948 |
| 600,938 | Great Britain | Apr. 22, 1948 |
| 102,197 | Sweden | July 29, 1941 |